Patented Nov. 22, 1927.

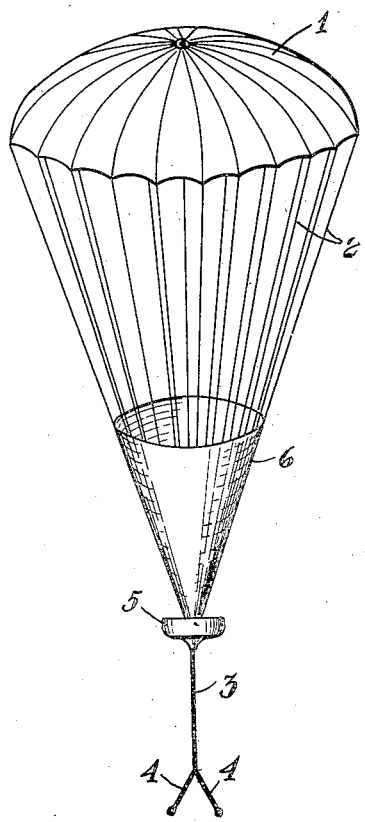

1,649,934

UNITED STATES PATENT OFFICE.

AXEL RAOUL THÖRNBLAD, OF STOCKHOLM, AND GUSTAF WILHELM NORDENSWAN, OF APPELVIKEN, SWEDEN.

PARACHUTE.

Application filed April 8, 1925, Serial No. 21,679, and in Sweden April 12, 1924.

In descending with a parachute from an aerial vehicle it frequently happens that the parachute system is subjected to swinging movements during the descent. These swinging movements, which may be produced on the jump from the aerial vehicle, if the latter moves at a great rate of speed through the air, and also, during the descent toward the ground, on account of gusts of wind and air pits, render landing with the parachute difficult and may even cause accidents. This is so for the reason that the great resistance of the air on the jump and the said gusts of wind and air pits force the parachute system out of its path of free fall in a direction straight downwards, in that the comparatively light parachute portion showing a large surface to be acted upon is actuated with a greater force than the relatively heavy body attached to the parachute, such body having only a small surface to be acted upon.

In order to stabilize a parachute, it has been previoulsy proposed to arrange wings at that portion of the parachute which is adjacent the falling load when the parachute is opened, said wings having the shape of four flaps arranged in the form of a cross. This arrangement, however, has the disadvantage that the parachute is caused to rotate by reason of the wings acting as blades of a propeller. In another parachute construction the casing serving for packing the parachute is attached to the supporting lines at the lower ends thereof, thus forming a kind of sail which, however, does not act as a stabilizing sail.

The object of the present invention is to obviate the disadvantages referred to and to prevent said swinging movements or to damp the same if produced, and to the attainment of this object, according to this invention, I provide an arrangement in parachutes having a body portion and supporting lines, consisting of a sail which is attached to that portion thereof adjacent the falling load when the parachute is open, characterized by said sail having the shape of a conical bag forming the apex of the cone limited by the supporting lines in the developed state of the parachute.

The present invention has for its object to prevent such swinging motions, and to damp the same if produced, and the invention consists therein that a sail is attached to the portion of the parachute which is adjacent the falling body. By this means the surface of the falling body to be acted upon by the air is increased, so to say, so that balancing of the falling system is improved upon.

Preferably, the sail is attached to the casing serving as a packing casing for the supporting lines and, preferably, also to the lower portions of the supporting lines attached to the attachment hawses and the connecting line, but the sail may also be attached to the line or the hawses connecting the falling body with the supporting lines.

According to one embodiment of the invention, the sail consists of one or more, approximately triangular flaps, the edges of which are attached to one or more of the supporting lines and the connecting lines or the attaching hawses. The sail may also consist of a conical bag which, when the parachute is developed, forms the apex of the cone determined by the mutual positions of the supporting lines. Preferably, a plurality or all of the supporting lines are then sewn fast to the said bag-shaped sail which is attached with its apex in the packing casing.

In the accompanying drawings, an embodiment of the invention is shown by way of example.

According to the drawing, the parachute consists of the parachute proper 1, the supporting lines 2, the connecting line 3, and the attaching hawses 4. Remaining at the parachute is also a portion of or the whole of the casing frame in which the parachute was packed prior to the jump.

In the embodiment shown in Fig. 1, there is attached onto the casing 5 a sail 6 having the shape of a bag which forms the lower portion of the cone determined by the supporting lines, and in which all of the supporting lines are sewn fast at their lower portion.

In addition to preventing swinging motions, or damping such motions, the said bag-shaped sail entails a number of other important advantages. For instance, the packing of the parachute is facilitated, inasmuch as the bag-shaped sail prevents entanglement of the lower portion of the supporting lines. Moreover, such a sail also prevents twisting of the supporting lines in the course of development of the parachute.

The sail also brings about the important advantage that it will damp the shock produced on the development of the parachute proper. This depends on the fact that the bag-shaped said will, on the development of the parachute proper, plow the air aside, so to say, so that the pressure on the parachute proper is reduced. When the parachute is opened, the sail will thus act as a regulator for the upwardly directed pressure on the parachute proper, in that the said sail causes a smaller quantity of air to enter the parachute when the rate of fall is great. By this arrangement bursting of the parachute is also prevented.

What we claim as new and desire to secure by Letters Patent of the United States of America is:—

1. An arrangement in parachutes, having a body portion and supporting lines, consisting of a sail which is attached to that portion thereof adjacent the falling load when the parachute is open, characterized by said sail having the shape of a conical bag forming the apex of the cone limited by the supporting lines in the developed state of the parachute.

2. An arrangement according to claim 1, characterized by a plurality or all of the supporting lines being attached to the sail.

3. An arrangement according to claim 1 characterized by the sail being attached to a casing serving as a packing casing for the parachute.

In testimony whereof we affix our signatures.

AXEL RAOUL THÖRNBLAD.
GUSTAF WILHELM NORDENSWAN.